(12) United States Patent
Kikuchi et al.

(10) Patent No.: US 9,578,184 B2
(45) Date of Patent: Feb. 21, 2017

(54) IMAGE FORMING APPARATUS AND METHOD FOR CONTROLLING IMAGE FORMING APPARATUS

(71) Applicant: KYOCERA Document Solutions Inc., Osaka (JP)

(72) Inventors: Masaki Kikuchi, Osaka (JP); Masaru Sato, Osaka (JP); Masayoshi Hayama, Osaka (JP); Kazunori Goto, Osaka (JP); Toshiya Miyai, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 14/949,042

(22) Filed: Nov. 23, 2015

(65) Prior Publication Data
US 2016/0156787 A1    Jun. 2, 2016

(30) Foreign Application Priority Data
Nov. 28, 2014   (JP) ................................. 2014-241511

(51) Int. Cl.
*H04N 1/00* (2006.01)
*H04N 1/60* (2006.01)

(52) U.S. Cl.
CPC ...... *H04N 1/00037* (2013.01); *H04N 1/00015* (2013.01); *H04N 1/00029* (2013.01); *H04N 1/00053* (2013.01); *H04N 1/00063* (2013.01); *H04N 1/00076* (2013.01); *H04N 1/00082* (2013.01); *H04N 1/00925* (2013.01); *H04N 1/6091* (2013.01); *H04N 2201/0094* (2013.01)

(58) Field of Classification Search
CPC ............ H04N 1/00037; H04N 1/00053; H04N 1/00076; H04N 1/00925; H04N 1/00029; H04N 1/00063; H04N 1/00082; H04N 1/6091; H04N 1/00015; H04N 2201/0094
USPC ................................................. 358/1.15, 504
See application file for complete search history.

(56) References Cited

U.S. PATENT DOCUMENTS

2016/0185047 A1*  6/2016  Windau .............. B29C 67/0059
                                                         358/406

FOREIGN PATENT DOCUMENTS

| JP | 2000-19895 A | 1/2000 |
|---|---|---|
| JP | 2002-225389 A | 8/2002 |
| JP | 2003-29488 A | 1/2003 |
| JP | 2004-233583 A | 8/2004 |
| JP | 2005-252887 A | 9/2005 |
| JP | 2008-66891 A | 3/2008 |
| JP | 2012-8231 A | 1/2012 |
| JP | 2013090173 A * | 5/2013 |

* cited by examiner

*Primary Examiner* — Kent Yip
(74) *Attorney, Agent, or Firm* — Stein IP, LLC

(57) ABSTRACT

An image forming apparatus includes a detection portion that detects an earthquake, a plurality of job execution portions that each execute a job, an output portion that outputs information, and a control portion that, upon the detection portion detecting the occurrence of an earthquake, switches a mode of the image forming apparatus to an emergency mode, after a lapse of a prescribed wait time since the switching to the emergency mode, executes a self-diagnosis process for checking whether or not the job execution portions operate properly, and based on a result thereof, makes an output portion output information indicating an executable job and a non-executable job.

10 Claims, 7 Drawing Sheets

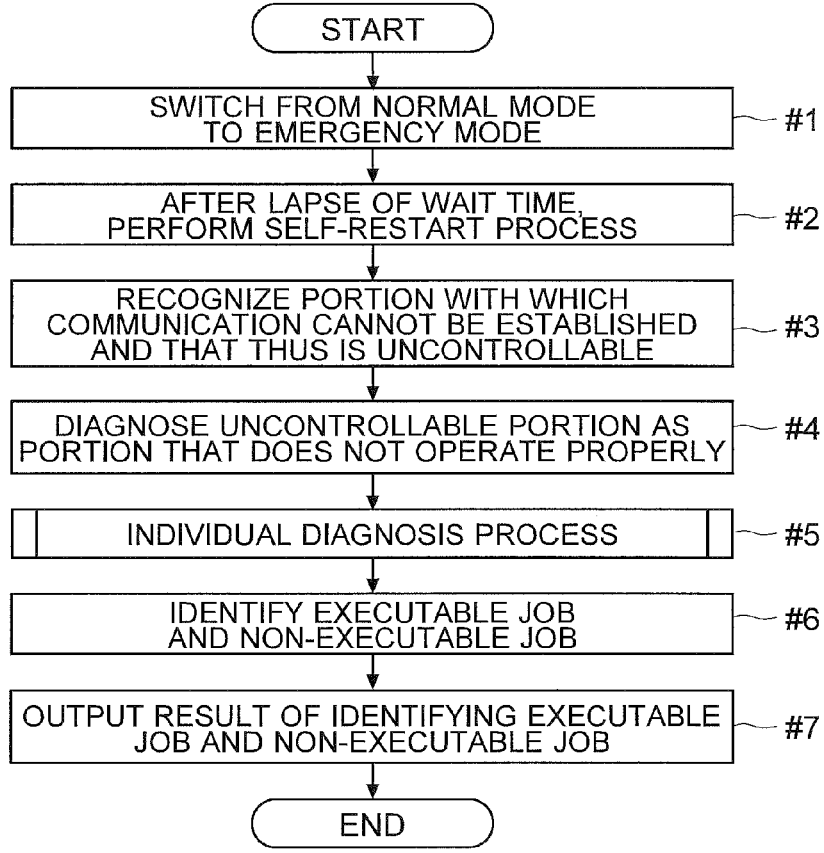

IMAGE FORMING APPARATUS AND METHOD FOR CONTROLLING IMAGE FORMING APPARATUS

This application is based upon and claims the benefit of priority from the corresponding Japanese Patent Application No. 2014-241511 filed on Nov. 28, 2014, the entire contents of which are incorporated herein by reference.

BACKGROUND

This disclosure relates to an image forming apparatus that, upon receiving a notification about an earthquake, makes a transition to a particular mode.

An image forming apparatus has a printing function. The image forming apparatus also has a communication function for performing data transmission/reception to/from a computer or a network. It is desirable that, at the occurrence of an emergency such as an earthquake, a wealth of functions owned by the image forming apparatus be utilized to ensure people's safety. Based on this viewpoint, there is known one example of an image forming apparatus described in the following.

To be specific, there is known an image forming apparatus that receives an earthquake early warning, acquires in advance safety information related to ensuring safety at the occurrence of an earthquake except for a map showing evacuation routes, stores the safety information thus acquired, and upon an earthquake early warning being received, while suspending a process in progress, prints out the safety information that has been stored. This configuration is intended to provide promptly information necessary to ensure safety at the occurrence of an earthquake by, upon receiving an earthquake early warning, while suspending a process in progress, printing out safety information that has been acquired in advance.

An image forming apparatus may be designed to be capable of detecting the occurrence of an earthquake by including a sensor that detects a vibration, such as a vibration sensor, or receiving an earthquake early warning. In a case of the above-described known image forming apparatus, upon detecting the occurrence of an earthquake, it suspends a print job and prints out safety information.

There is, however, a case where, due to an earthquake, a malfunction occurs in an image forming apparatus. The image forming apparatus is a precision machine and thus may malfunction when subjected to an impact. Particularly in an earthquake causing large vibrations, even the image forming apparatus is shaken largely. As a result, there is a case where the image forming apparatus collides against a wall or an object installed in an office, such as a desk, a case where the image forming apparatus falls over, or a case where some object falls on the image forming apparatus. When a malfunction occurs due to an earthquake, a job using a malfunctioning portion becomes non-executable. That is, there is a possibility that, due to a malfunction caused by an earthquake, part of functions of the image forming apparatus become unavailable (part of jobs become non-executable).

It may not be obvious at a glance that, due to an earthquake, a malfunction has occurred in an image forming apparatus. There is a case where, since a malfunctioning portion is unknown, a user attempts to make the image forming apparatus perform a job using the portion in which the malfunction is occurring. Since the malfunction has been occurring, however, the job could not be completed, and this situation is detected as the occurrence of an error.

Once such an error is detected, in the image forming apparatus, a certain job is no longer executable until the error is corrected. Moreover, the error continues to be detected until repair of the malfunctioning portion is completed. After the earthquake, a state continues where, although a job using a portion in which no malfunction is occurring still is executable, the entire image forming apparatus is unavailable. There is, therefore, a problem that it should be promptly detected which function has become unavailable as a result of the occurrence of an earthquake.

The above-mentioned known image forming apparatus, upon detecting the occurrence of an earthquake, suspends a print job and prints out safety information. In a case, however, where, due to an earthquake, a malfunction has occurred in a portion in which printing is performed, safety information cannot be printed out, so that this situation is detected as the occurrence of an error, leading to a possibility that a state continues where the image forming apparatus is unavailable.

SUMMARY

An image forming apparatus according to one aspect of the present disclosure includes a detection portion, a job execution portion, an output portion, and a control portion. The detection portion is a portion for detecting the occurrence of an earthquake. As the job execution portion, there are a plurality of types of job execution portions that each execute a job. The output portion outputs information. The control portion controls the job execution portions, upon the detection portion detecting the occurrence of an earthquake, switches a mode of the image forming apparatus from a normal mode to an emergency mode, after a lapse of a predetermined wait time since the switching to the emergency mode, executes a self-diagnosis process for checking whether or not the job execution portions operate properly, based on a result of the self-diagnosis process, determines an executable job and a non-executable job, and makes the output portion output information indicating the executable job and the non-executable job.

Further features and advantages of the present disclosure will become apparent from the description of an embodiment given below.

BRIEF DESCRIPTION OF THE DRAWINGS

FIG. 4 is a flow chart showing a flow of a self-diagnosis process of the multi-functional peripheral according to the embodiment.

FIG. 5 is a diagram showing one example of a check result displaying screen.

DETAILED DESCRIPTION

The following discloses that, in response to the occurrence of an earthquake, a mode of an image forming apparatus is switched to an emergency mode in which the image forming apparatus is made to perform self-diagnosis of an available function so that, after the occurrence of the earthquake, the available function is promptly identified and made known to a user. With reference to FIG. 1 to FIG. 10, an explanation is given of an embodiment by using a multi-functional peripheral 100 (corresponding to an image forming apparatus) as an example. Various components such as a configuration, an arrangement, and so on described in this embodiment, however, are not intended to limit the scope of the disclosure but are merely used as an illustrative example.

(Schematic Configuration of Image Forming Apparatus)

Figure 1:
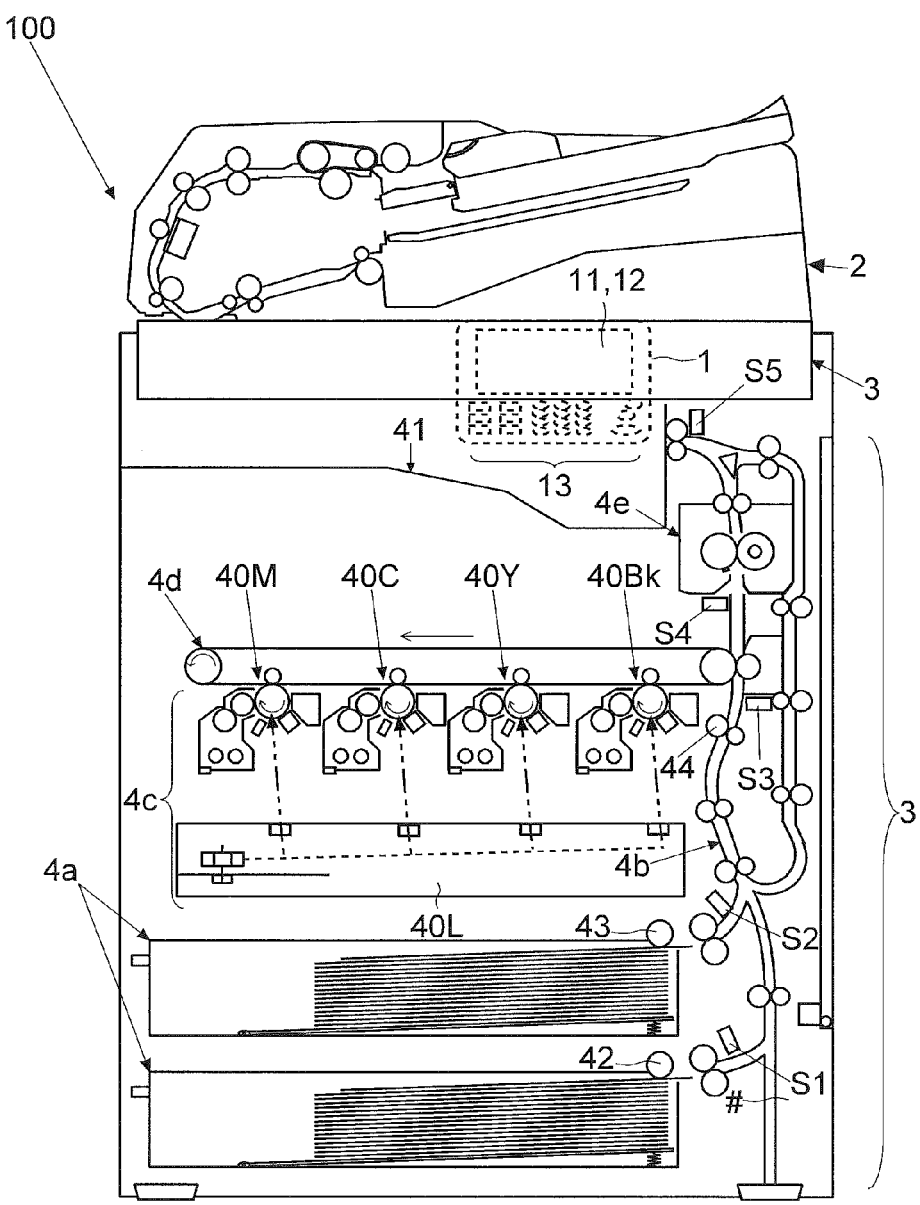
FIG. 1 is a diagram showing one example of a multi-functional peripheral according to an embodiment.

First, with reference to FIG. 1, a brief explanation is given of the multi-functional peripheral 100 according to the embodiment. As shown in FIG. 1, the multi-functional peripheral 100 has an operation panel 1 (shown by a broken line) on its front surface. Furthermore, at an upper portion of the multi-functional peripheral 100, an original document conveying portion 2 and an image reading portion 3 are provided. Furthermore, inside the multi-functional peripheral 100, a printing portion 4 (a paper feed portion 4a, a conveying portion 4b, an image forming portion 4c, an intermediate transfer portion 4d, and a fixing portion 4e) that performs printing is provided.

The operation panel 1 includes a display portion 11 that displays a status of the multi-functional peripheral 100, a message, and a setting screen. Furthermore, with respect to the display portion 11, a touch panel portion 12 is provided. The touch panel portion 12 accepts an input operation (a touch) with respect to a screen. The touch panel portion 12 is to detect, on the display portion 11, a position and coordinates of a pressed portion. Based on an output of the touch panel portion 12, an operated (pressed) button or soft key is recognized. Furthermore, on the operation panel 1, a plurality of hard keys 13 such as a start key and a numeric keypad also are provided.

The original document conveying portion 2 continually and automatically conveys original documents, which have been set, one by one toward a feed-reading contact glass (a reading position, which is not shown). The image reading portion 3 reads an original document passing through the feed-reading contact glass or an original document set on a place-reading contact glass (not shown) and generates image data.

The paper feed portion 4a houses a plurality of paper sheets. In an example shown in FIG. 1, two paper feed cassettes are provided as the paper feed portion 4a. When a print job is executed, either one of the paper feed cassettes feeds out the paper sheets one by one to the conveying portion 4b. The conveying portion 4b conveys each of the paper sheets supplied from the paper feed portion 4a. Based on the image data, the image forming portion 4c forms a toner image. The multi-functional peripheral 100 of this embodiment is capable of color printing. The image forming portion 4c, therefore, includes an image forming unit 40Bk that forms a black toner image, an image forming unit 40Y that forms an yellow toner image, an image forming unit 40C that forms a cyan toner image, and an image forming unit 40M that forms a magenta toner image. Furthermore, in the image forming portion 4c, an exposure device 40L is provided that scans with and exposes to laser light photosensitive drums included in the image forming units 40Bk to 40M, respectively, and forms an electrostatic latent image on each of the photosensitive drums.

The intermediate transfer portion 4d receives a primarily transferred toner image formed at each of the image forming units 40Bk to 40M and secondarily transfers the toner image on a paper sheet. The fixing portion 4e fixes the toner image transferred on the paper sheet. The paper sheet on which the toner image has been fixed is ejected onto an ejection tray 41.

Figure 3:
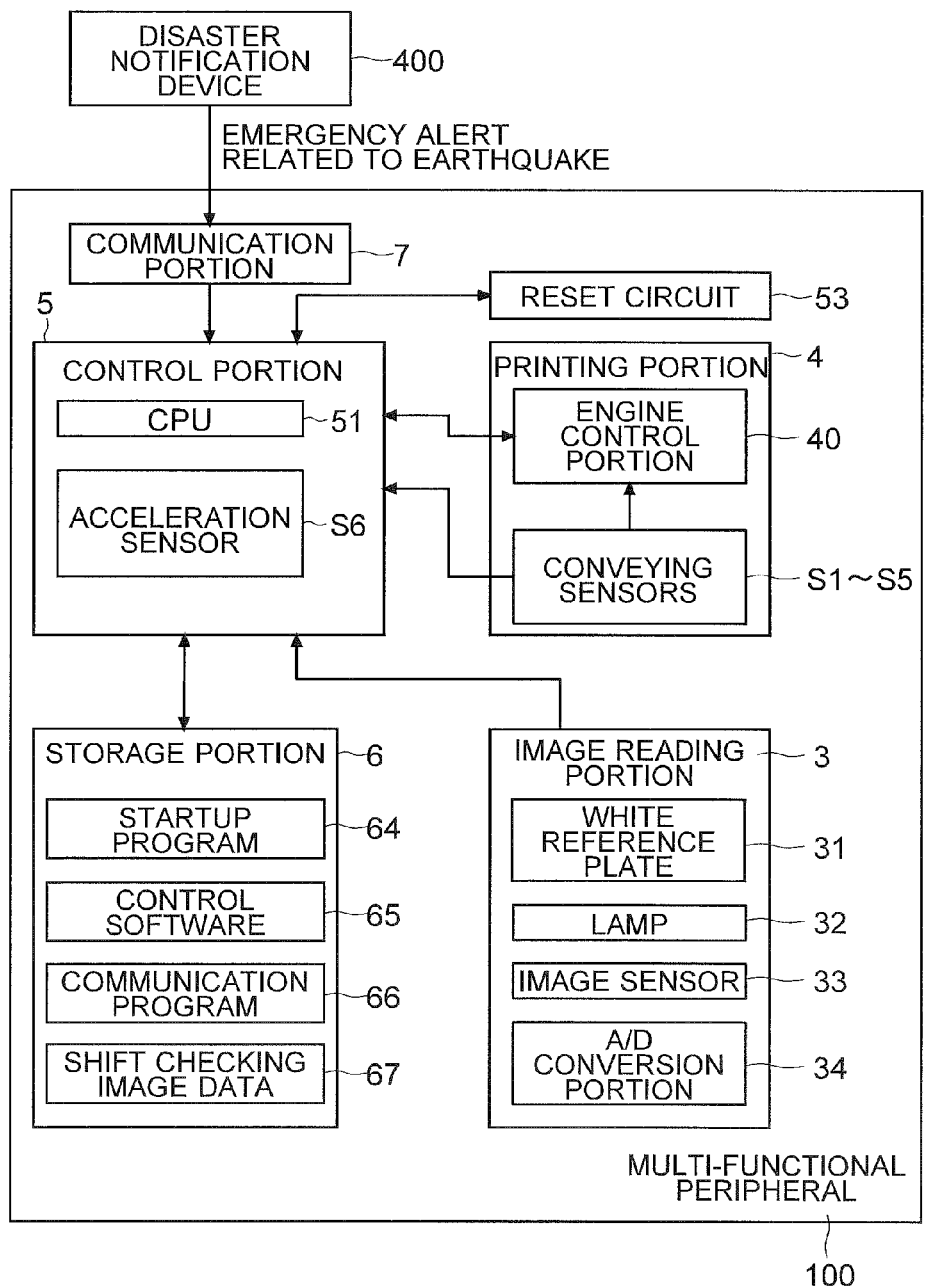
FIG. 3 is a diagram showing part of the multi-functional peripheral according to the embodiment.

In the multi-functional peripheral 100 of this embodiment, a plurality of conveying sensors S1, S2, S3, S4, and S5 are provided (see FIG. 3). The conveying sensors S1 and S2 are provided in the vicinity of paper feed rollers 42 and 43 of the cassettes, respectively. The conveying sensor S3 is provided on an upstream side of a registration roller pair 44 that feeds out a paper sheet so that the paper sheet is aligned with a toner image. The conveying sensor S4 is provided at a position of an entrance port of a fixing device. The conveying sensor S5 is provided at a paper sheet ejection port. The conveying sensors S1 to S5 can be formed of a photosensor. An output level ("High" and "Low") of each of the conveying sensors S1 to S5 varies depending on whether or not they have detected the presence of a paper sheet.

(Hardware Configuration of Image Forming Apparatus)

Figure 2:
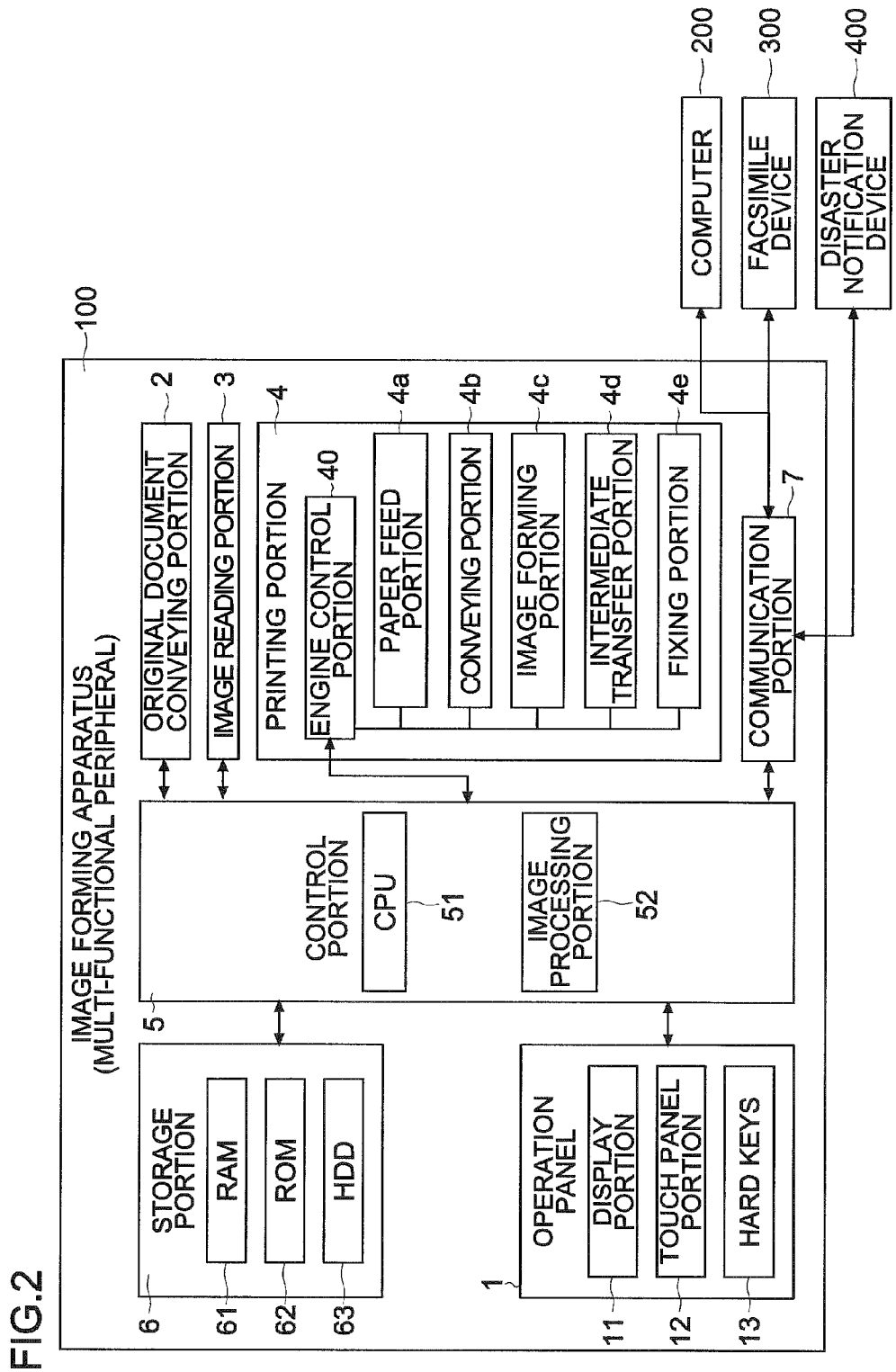
FIG. 2 is a block diagram showing one example of a configuration of the multi-functional peripheral according to the embodiment.

Next, based on FIG. 2, an explanation is given of one example of a hardware configuration of the multi-functional peripheral 100 according to the embodiment. In the multi-functional peripheral 100, a control portion 5 is provided. The control portion 5 includes circuits for performing control and processes, such as a CPU 51 and an image processing portion 52. Based on programs and data stored in a storage portion 6, the CPU 51 performs various types of computation processes and control of various portions included in the image forming apparatus. The image processing portion 52 performs image processing such as concentration conversion, zooming in and out, and data format conversion. In accordance with an intended type of printing (the print job or a copy job) or data communication (a transmission job or a reception job), the image processing portion 52 performs image processing with respect to image data. The image data thus subjected to the image processing is used for the job.

The storage portion 6 is a combination of a volatile storage device such as a RAM 61 and a nonvolatile storage device such as a ROM 62 or an HDD 63. The storage portion 6 stores a various types of programs for controlling the multi-functional peripheral 100 and various types of data such as setting data and image data.

Furthermore, in the multi-functional peripheral 100, an engine control portion 40 that controls an operation of the printing portion 4 is provided. When printing such as the print job or the copy job is performed, the control portion 5 provides the engine control portion 40 with data indicating settings related to the printing and an intended type of printing. Based on an instruction from the control portion 5, the engine control portion 40 controls operations (paper feeding, paper sheet conveyance, toner image formation, fixing, and paper sheet ejection) of the portions included in the printing portion 4.

Furthermore, the control portion 5 is connected to the original document conveying portion 2 and the image reading portion 3 so as to be able to communicate therewith. When an original document is read such as in the copy job or a scan job, the control portion 5 controls respective operations of the original document conveying portion 2 and the image reading portion 3. Furthermore, the control portion 5 is connected to the operation panel 2 so as to be able to communicate therewith. The control portion 5 controls a display of the display portion 11. Furthermore, based on respective outputs of the touch panel portion 12 and the hard keys 13, the control portion 5 recognizes intended settings.

In addition, a communication portion 7 is provided that includes communication circuits (hardware) such as a connector, a socket, and a chip as well as software. The communication portion 7 communicates with a computer 200 such as a PC or a server via a network or a cable. Furthermore, the communication portion 7 is capable of communication with an external facsimile device 300 via a public telephone line or a network. When the transmission job is performed, the communication portion 7 is used. Furthermore, the communication portion 7 may be provided with a function of receiving radio waves.

(Detection of Occurrence of Earthquake)

Next, with reference to FIG. 2 and FIG. 3, an explanation is given of detection of the occurrence of an earthquake by the multi-functional peripheral 100. The communication portion 7 externally receives a notification of the occurrence of an earthquake. The notification thus received is transmitted to the control portion 5. The control portion 5 then recognizes that the earthquake has occurred. It can be set as appropriate what type of notification received by the communication portion 7 should be dealt with as the occurrence of an earthquake. When the communication portion 7 has received, through broadcasting or a line, an emergency alert related to an earthquake, the control portion 5 judges that the earthquake has occurred. An emergency alert related to an earthquake is issued by the government itself or a provider of a distribution service that has received information from the government, such as a mobile phone service provider. In this case, a disaster notification device 400 in FIG. 2 and FIG. 3 is a device that belongs to a distributer of an emergency alert. As described above, based on information received by the communication portion 7, the control portion 5 can detect and recognize that an earthquake has occurred.

Furthermore, inside the multi-functional peripheral 100, an earthquake detection sensor such as an acceleration sensor S6 may be provided. In a case where such an earthquake detection sensor is provided, based on an output of this sensor, the control portion 5 detects and recognizes that an earthquake has occurred.

(Flow of Self-Diagnosis Process at Occurrence of Earthquake)

Next, with reference to FIG. 2 to FIG. 5, an explanation is given of a self-diagnosis process of the multi-functional peripheral 100 according to the embodiment. A timing of "Start" in a flow chart in FIG. 4 is a point in time when, in a state where main power of the multi-functional peripheral 100 has been turned on by switching on a main power switch (not shown), the control portion 5 has detected and recognized the occurrence of an earthquake. The multi-functional peripheral 100 has a standby mode in which jobs are maintained in an executable state and a power saving mode in which power consumption is reduced compared with that in the standby mode. In the power saving mode, the jobs are not immediately executable. It is possible, however, to continue power supply to part of the control portion 5 and the communication portion 7. Even in the power saving mode, it is possible to continue power supply to the communication portion 7 and the part of the control portion 5. Thus, even in the power saving mode, the control portion 5 can detect (recognize) the occurrence of an earthquake.

First, the control portion 5 switches a mode of the multi-functional peripheral 100 from a normal mode to an emergency mode (Step #1). The normal mode will be detailed later (see FIG. 10). After a lapse of a predetermined wait time since detection of the occurrence of an earthquake, as one form of the self-diagnosis process, the control portion 5 performs a self-restart process (Step #2).

First, the wait time is a time set as appropriate. The wait time is set to be a length of time from the occurrence of an earthquake to a time when it is acknowledged that vibrations of the earthquake have subsided. The wait time can be set as a length of time in a range of several tens of seconds to a dozen or so minutes.

The self-restart process is a process in which the control portion 5 triggers a reset so as to be restarted. In the multi-functional peripheral 100, a reset circuit 53 is provided that, after driving of all components in the control portion 5 has been halted by temporarily cuffing off power being inputted to the control portion 5, restarts power supply to the control portion 5 to reset the control portion 5 (see FIG. 3). Upon recognizing the occurrence of an earthquake, the control portion 5 makes the reset circuit 53 reset the control portion 5 (control board).

With the control portion 5 thus reset, the control portion 5 starts a restart. In the process of the restart, from the RAM 61 and the HDD 63 in the storage portion 6, a startup program 64, control software 65, and a communication program 66 for establishing communication with a portion to be controlled by the control portion 5, such as the operation panel 1, the original document conveying portion 2, the image reading portion 3, the engine control portion 40 (printing portion 4), or the communication portion 7 are read out. The control portion 5 executes the programs and software thus read out.

Upon switching to the emergency mode, in a particular area in a nonvolatile area of the storage portion 6, a fact that the emergency mode has been established is stored. At startup, the control portion 5 examines data in the particular area to check whether or not the fact that the emergency mode has been established (an emergency mode flag) has been written. When the emergency mode flag has been written, the control portion 5 recognizes that the current startup is one based on the self-restart process following a transition to the emergency mode and that the current mode is a post-restart emergency mode. The emergency mode flag may be deleted when a startup based on the self-restart process has been completed once or when the main power of the multi-functional peripheral 100 is turned off. When the fact that the emergency mode has been established has not been written, the control portion 5 switches the mode of the multi-functional peripheral 100 to the normal mode (performs a startup in the normal mode).

Then, in the process of the restart in the emergency mode, the control portion 5 recognizes, among the portions to be controlled, a portion with which communication cannot be established and that thus is uncontrollable (Step #3). In other words, the control portion 5 determines, among the portions in the multi-functional peripheral 100, a portion with which communication has been shut off due to a malfunction caused by an earthquake.

Subsequently, the control portion 5 diagnoses the uncontrollable portion as a portion that does not operate properly (a portion in which a malfunction has occurred due to an earthquake) (Step #4). When communication with the operation panel 1 cannot be established, the control portion 5 diagnoses the operation panel 1 as a portion that does not operate properly. Furthermore, when communication with the original document conveying portion 2 cannot be established, the control portion 5 diagnoses the original document conveying portion 2 as a portion that does not operate properly. Furthermore, when communication with the image reading portion 3 cannot be established, the control portion 5 diagnoses the image reading portion 3 as a portion that does not operate properly. Furthermore, when communication with the engine control portion 40 (printing portion 4) cannot be established, the control portion 5 diagnoses the printing portion 4 as a portion that does not operate properly. Furthermore, when communication with the communication portion 7 cannot be established, the control portion 5 diagnoses the communication portion 7 as a portion that does not operate properly.

Subsequently, with respect to each of the printing portion 4, the communication portion 7, and the image reading portion 3, the control portion 5 performs an individual diagnosis of whether or not each of them operates properly (an individual diagnosis process, which will be detailed later at Step #5). In other words, as one form of the self-diagnosis process, the control portion 5 performs the individual diagnosis process.

Then, based on a portion that operates properly and a portion that does not operate properly, which have been successfully determined by the self-diagnosis process (the self-restart process and the individual diagnosis process), the control portion 5 determines, among jobs executable by the multi-functional peripheral 100, an executable job and a non-executable job (Step #6).

The multi-functional peripheral 100 is capable of performing the print job (a function that uses the multi-functional peripheral 100 as a printer) to perform printing based on image data or printing data transmitted from the computer 200 or the facsimile device 300, the copy job (a function that uses the multi-functional peripheral 100 as a copier) to perform printing based on image data obtained by reading an original document at the image reading portion 3, a scan transmission job (a function that uses the multi-functional peripheral 100 as an image data transmitter) to transmit image data generated by the image processing portion 52 based on reading at the image reading portion 3 to the computer 200 or the facsimile device 300, and a stored data transmission job to transmit image data stored in the HDD 63 from the computer 200 via the communication portion 7 to the computer 200 or the facsimile device 300, and so on.

In order to execute the print job, it is necessary that the printing portion 4 perform proper printing and that the communication portion 7 be capable of proper communication. Based on this, when it is successfully diagnosed that the printing portion 4 and the communication portion 7 operate properly, the control portion 5 judges that the print job is executable. On the other hand, when it is diagnosed that either the printing portion 4 or the communication portion 7 does not operate properly, the control portion 5 judges that the print job is non-executable.

Furthermore, in order to execute the copy job, it is necessary that the printing portion 4 perform printing properly and that the image reading portion 3 be able to read an original document properly. Based on this, when it is successfully diagnosed that the printing portion 4 and the image reading portion 3 operate properly, the control portion 5 judges that the copy job is executable. On the other hand, when it is diagnosed that either the printing portion 4 or the image reading portion 3 does not operate properly, the control portion 5 judges that the copy job is non-executable.

Furthermore, in order to execute the scan transmission job, it is necessary that the image reading portion 3 be able to read an original document properly and that the communication portion 7 be capable of proper communication with the computer 200 or the like. Based on this, when it is successfully diagnosed that the image reading portion 3 and the communication portion 7 operate properly, the control portion 5 judges that the scan transmission job is executable. On the other hand, when it is diagnosed that either the image reading portion 3 or the communication portion 7 does not operate properly, the control portion 5 judges that the scan transmission job is non-executable. It may also be judged whether or not jobs of types such as the stored data transmission job other than the print job, the copy job, and the scan transmission job are executable.

Then, the control portion 5 makes an output portion output a result of determining an executable job and a non-executable job based on the self-diagnosis process (Step #7). The output portion is composed of the printing portion 4, the communication portion 7, and the operation panel 1. By using a portion that operates properly among the printing portion 4, the communication portion 7, and the operation panel 1, the determination result by the control portion 5 is outputted. In a case where there are a plurality of portions that operate properly among the printing portion 4, the communication portion 7, and the operation panel 1, the control portion 5 may make any one of them output the determination result or make the plurality of portions output the determination result.

FIG. 5 shows one example of a case where a result of judging whether or not the print job, the copy job, or the scan transmission job is executable is outputted to the display portion 11 of the operation panel 1. In the example in FIG. 5, it is shown that, while the printing portion 4 does not operate properly, and hence the print job and the copy job are non-executable, the communication portion 7 and the image reading portion 3 operate properly, and thus the scan transmission job is executable. Furthermore, when making the printing portion 4 output the determination result, the control portion 5 instructs the engine control portion 40 to make the printing portion 4 print information indicating the determination result. Furthermore, in a case where the determination result is outputted through communication, the control portion 5 makes the communication portion 7 transmit data indicating the determination result toward a predetermined communication partner.

(Individual Diagnosis Process for Printing Portion 4)

Next, with reference to FIG. 1, FIG. 3, FIG. 6, and FIG. 7, an explanation is given of an individual diagnosis process for the printing portion 4 at Step #5 in the flow chart in FIG. 4.

Figure 6:
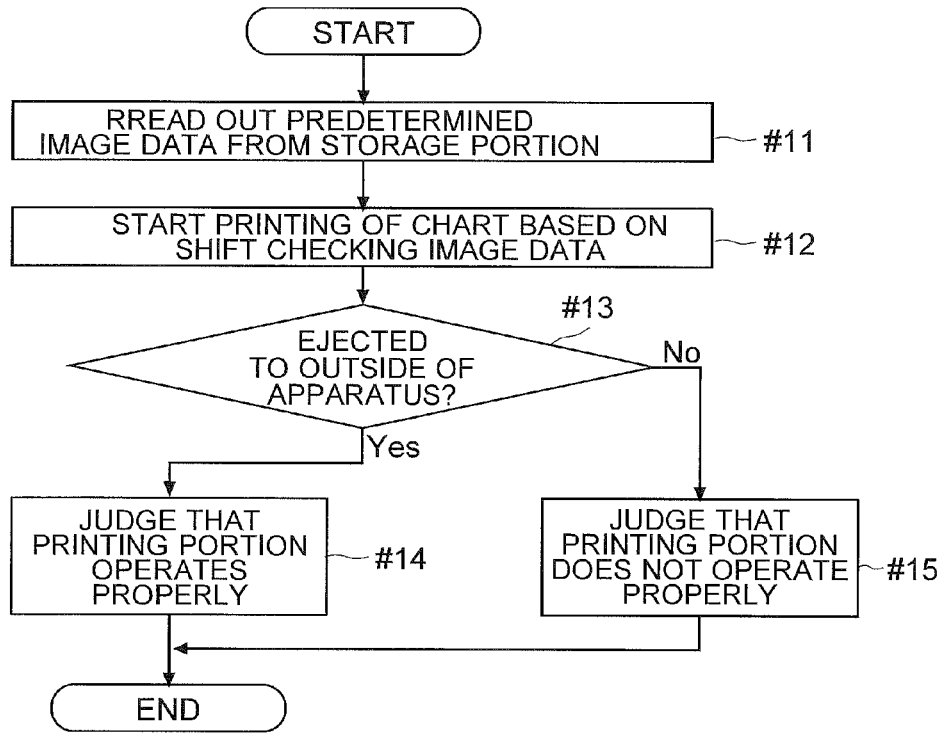
FIG. 6 is a flow chart showing a flow of an individual diagnosis process for a printing portion according to the embodiment.

A timing of "Start" in FIG. 6 is after, with a transition made to the emergency mode, the control portion 5 has executed the self-restart process and a restart of the control portion 5 has been completed. Furthermore, this timing represents a state where, by the self-restart process, the control portion 5 has successfully established communication with the engine control portion 40. When, due to the occurrence of a malfunction, communication with the engine control portion 40 has not been successfully established by the self-restart process, it is impossible to operate the engine control portion 40 and the printing portion 4 properly, in which case this flow chart does not have to be executed.

First, the control portion 5 reads out, from the storing portion 6, predetermined image data to be used for the individual diagnosis process for the printing portion 4 (Step #11). As the predetermined image data, shift checking image data 67 is used. The shift checking image data 67 is used to print a chart 8 for checking a positional shift (color shift) of each of toner images of different colors superimposed on each other.

The control portion 5 instructs the printing portion 4 (engine control portion 40) to start printing of the charts 8 based on the shift checking image data 67 (Step #12). Here, with reference to FIG. 7, an explanation is given of the chart 8 according to the embodiment. While in this explanation, with respect to black as a reference color, a positional shift amount of a toner image of each of other colors (yellow, cyan, and magenta) is checked, as the reference color, any other color than black also may be used.

Figure 7:
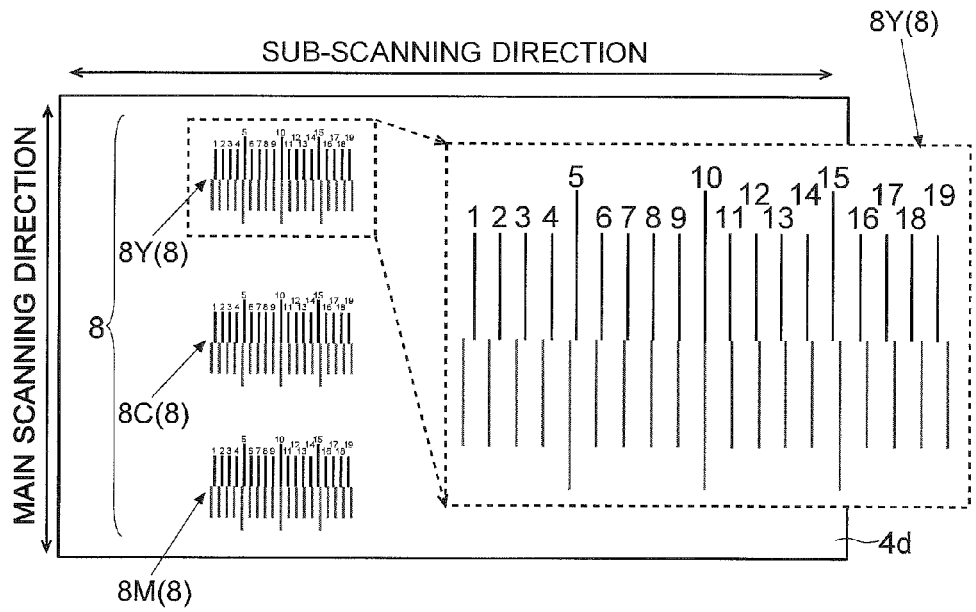
FIG. 7 is a diagram showing one example of a color shift checking chart printed by the printing portion at the time of the individual diagnosis process.

As shown in FIG. 7, the control portion 5 makes the printing portion 4 (engine control portion 40) print the charts 8 including an yellow checking image 8Y for grasping a positional shift amount between yellow and black, a cyan checking image 8C for grasping a positional shift amount between cyan and black, and a magenta checking image 8M for grasping a positional shift amount between magenta and black. While an example is shown in which, on a paper sheet, a single chart 8 is formed for each color, two or more charts 8 may be formed for each color.

The checking images for the different colors are designed similarly. A detailed explanation of the charts 8, therefore, is given by using an enlarged version of the yellow checking image 8Y shown in FIG. 7. Each of the charts 8 is formed by arranging, in a sub-scanning direction, a plurality (in this example, 19) of combinations of a black line (an upper side line) extending in a main scanning direction and a lower side line of any other color (in this case, yellow) extending in the main scanning direction. Furthermore, the combinations are numbered.

In the chart 8, among the combinations thus arranged, those (Number 9 to Number 1) on a left side with respect to a center (Number 10) are arranged so that a spacing between adjacent ones of yellow lines is systematically increased by a constant increment toward the left side. For example, a spacing between the yellow lines of Number 1 and Number 2 is wider than that between the yellow lines of Number 9 and Number 10. On the other hand, those (Number 11 to Number 19) on a right side with respect to the center are arranged so that a spacing between adjacent ones of the yellow lines is systematically increased by a constant increment toward the right side. For example, a spacing between the yellow lines of Number 19 and Number 18 is wider than that between the yellow lines of Number 10 and Number 11. When there is no positional shift, the black line and the yellow line in the combination of Number 10 are connected to each other in alignment. The combination of the lines of Number 10 is used as a reference combination.

When there is a positional shift between toner images superimposed on each other in the sub-scanning direction, in one of the combinations other than the combination at the center (Number 10), the black line and the yellow line are connected to each other in alignment. In this case, a user or a service man inputs, on the operation panel 1, a position of the one of the combinations that achieves the most precise alignment between the black line and the yellow line. This allows the control portion 5 to grasp a current positional shift amount of each of the different colors with respect to black.

Then, based on an output of each of the conveying sensors S1 to S5, the control portion 5 checks whether or not a paper sheet has been conveyed without paper jamming and then ejected onto the ejection tray 41 (outside of the apparatus) (Step #13). Each of the conveying sensors S1 to S5 is installed at a fixed position. Thus, a distance from a leading position of a paper sheet being fed and the position of each of the conveying sensors S1 to S5 also is fixed. Furthermore, a speed at which a paper sheet is conveyed also is set depending on specifications of the multi-functional peripheral 100. From the start of feeding a paper sheet from the paper feed portion 4a, with respect to each of the conveying sensors S1 to S5, a time frame in which paper sheet arrival (a paper sheet is present) is to be detected and a time frame in which paper sheet passing (a paper sheet is absent) is to be detected are stored in the storage portion 6 as jam detection data. Based on an output of each of the conveying sensors S1 to S5 and the jam detection data, the control portion 5 detects a paper sheet jam (paper jamming). To be specific, with respect to each of the conveying sensors S1 to S5, when it cannot be detected that "a paper sheet is present" in the time frame in which paper sheet arrival is to be detected, the control portion 5 recognizes that a jam error has occurred. Furthermore, with respect to each of the conveying sensors S1 to S5, when it cannot be detected that "a paper sheet is absent" in the time frame in which paper sheet passing is to be detected, the control portion 5 recognizes that a jam error has occurred.

When a paper sheet is ejected to the outside of the apparatus without paper jamming (Yes at Step #13), the control portion 5 judges that the printing portion 4 operates properly (Step #14). On the other hand, when a paper sheet jam has occurred (No at Step #13), the control portion 5 judges that the printing portion 4 does not operate properly (Step #15). Step #14 and Step #15 complete the individual diagnosis process for the printing portion 4 (End). When, by the individual diagnosis process, it is diagnosed that the printing portion 4 does not operate properly, the control portion 5 judges that the print job and the copy job are non-executable.

When the charts 8 are printed, a positional shift correction input screen (not shown) may be displayed on the operation panel 1. To be specific, on the positional shift correction input screen, with respect to each of the different colors (yellow, cyan, and magenta), the operation panel 1 accepts an input of a number of one of the combinations having the least shift from the black line. With this number inputted, with respect to each of the different colors, the control portion 5 can recognize a positional shift amount between and a shift direction on toner images superimposed on each other. In the storage portion 6, a table is stored that correlates the number selected with the positional shift amount and the shift direction. Based on the table and the number inputted, the control portion 5 recognizes the positional shift amount and the shift direction.

Then, the control portion 5 makes a correction to shift, in the unit of a line, a writing timing for writing a leading line on a photosensitive drum 41 so that a shift amount is zero or a minimum. To be specific, the control portion 5 makes an adjustment to shift an exposure starting timing for exposing each page by semiconductor lasers of the different colors of the exposure device 40. By this configuration, even when, due to an impact or the like caused by an earthquake, a position of a toner image of any of the different colors is shifted from an appropriate position, a correction (adjustment) can be made immediately after the occurrence of the earthquake.

(Individual Diagnosis Process for Communication Portion 7)

Figure 8:
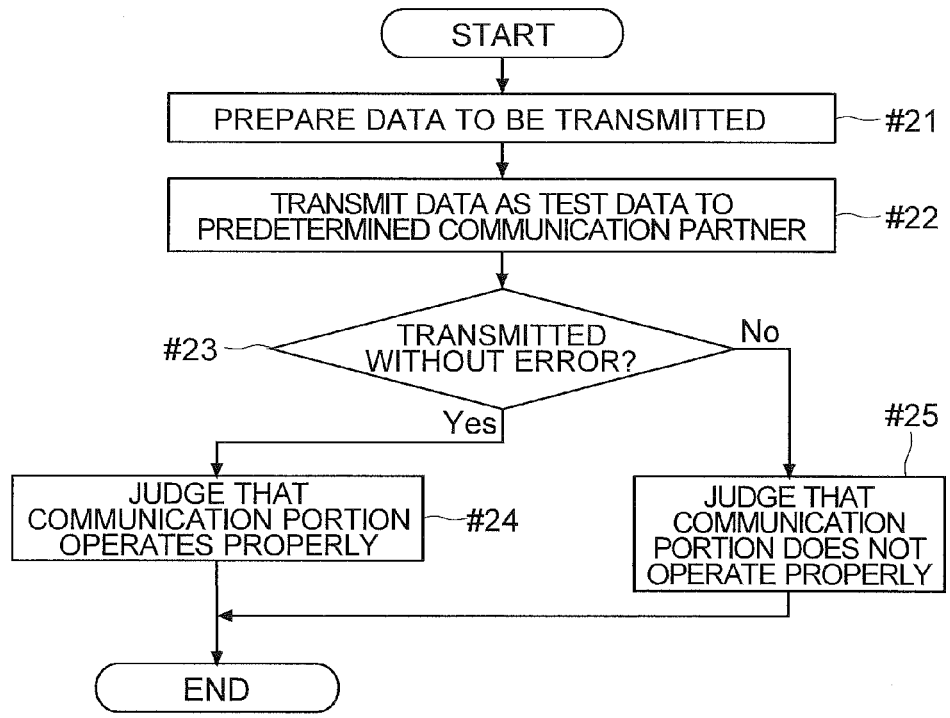
FIG. 8 is a flow chart showing a flow of an individual diagnosis process for a communication portion according to the embodiment.

Next, with reference to FIG. 3 and FIG. 8, an explanation is given of an individual diagnosis process for the communication portion 7 at Step #5 in the flow chart in FIG. 4.

A timing of "Start" in FIG. 8 is after, with a transition made to the emergency mode, the control portion 5 has executed the self-restart process and a restart of the control portion 5 has been completed. Furthermore, this timing represents a state where, by the self-restart process, the control portion 5 has successfully established communication (signal exchange) with the communication portion 7. When communication between the control portion 5 and the communication portion 7 has not been successfully established by the self-restart process, it is impossible for the control portion 5 to operate the communication portion 7 properly, in which case this flow chart does not have to be executed.

First, the control portion 5 prepares test data to be transmitted to a predetermined communication partner (Step #21). The test data is data for checking whether or not the communication portion 7 is capable of transmission and there is no particular limitation thereto. As the test data, a model number of the multi-functional peripheral 100, a serial number thereof, or a character string indicating that a transmission is made as a test of the individual diagnosis process can be used.

Then, the control portion 5 makes the communication portion 7 transmit the test data toward the predetermined communication partner (Step #22). The predetermined communication partner can be set as appropriate. For example, a server installed on an local network in a company can be set as the predetermined communication partner. The number of predetermined communication partners is not limited to one, and a plurality of predetermined communication partners may be set. Furthermore, there is no limitation to network communication with the computer 200, and it may be checked whether or not facsimile communication is enabled. For example, the test data may be transmitted to the facsimile device 300 installed in a company as the communication partner.

The control portion 5 checks whether or not the test data has been successfully transmitted to the communication partner without an error (Step #23). When a time has elapsed without the communication portion 7 receiving a response to its call to the communication partner to cause a time-out, the control portion 5 recognizes that a communication error has occurred. Furthermore, when, after instructing the communication portion 7 to start communication, the control portion 5 has not received a report from the communication portion 7 that the data has been transmitted within a set period of time, the control portion 5 recognizes that a communication error has occurred. On the other hand, when there has been a response from the communication partner to a call of the communication portion 7 and from the communication partner, a response that data reception has been completed has been received, the control portion 5 judges that communication has been successfully achieved without an error.

When communication has been successfully achieved without an error (Yes at Step #23), the control portion 5 judges that the communication portion 7 operates properly (Step #24). On the other hand, when an error has occurred in communication (No at Step #23), the control portion 5 judges that the communication portion 7 does not operate properly (Step #25). Step #24 and Step #25 complete the individual diagnosis process for the communication portion 7 (End). When, by the individual diagnosis process, it is diagnosed that the communication portion 7 does not operate properly, the control portion 5 judges that the print job and the scan transmission job are non-executable.

(Individual Diagnosis Process for Image Reading Portion 3)

Figure 9:
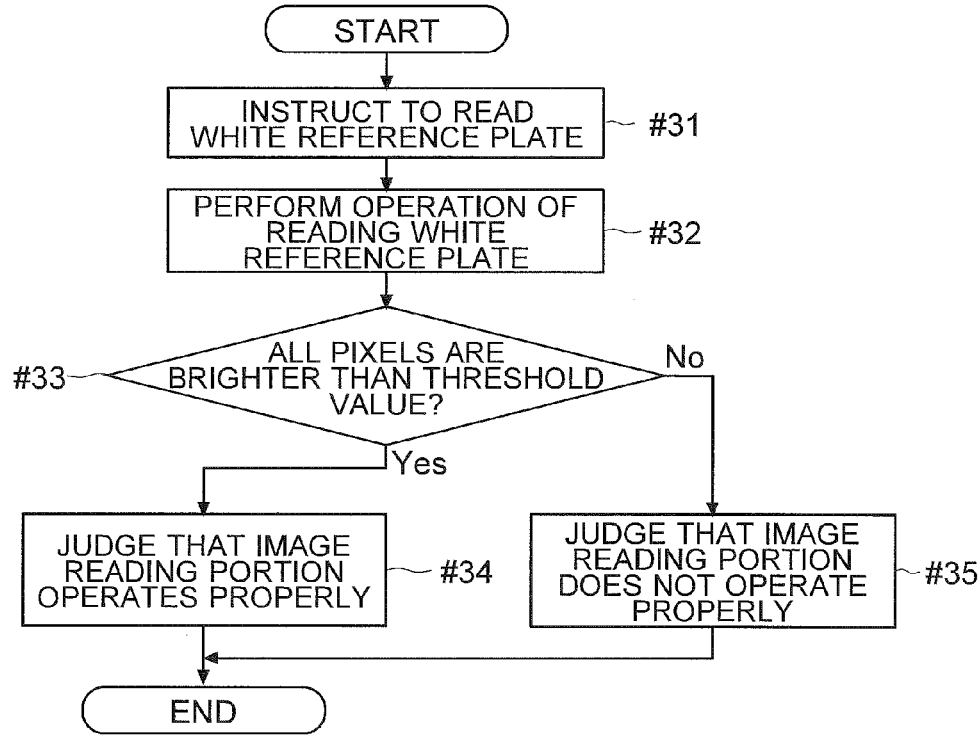
FIG. 9 is a flow chart showing a flow of an individual diagnosis process for an image reading portion according to the embodiment.

Next, with reference to FIG. 3 and FIG. 9, an explanation is given of an individual diagnosis process for the image reading portion 3 at Step #5 in the flow chart in FIG. 4.

A timing of "Start" in FIG. 9 is after, with a transition made to the emergency mode, the control portion 5 has executed the self-restart process and a restart of the control portion 5 has been completed. Furthermore, this timing represents a state where, by the self-restart process, the control portion 5 has successfully established communication (signal exchange) with the image reading portion 3. When communication between the control portion 5 and the image reading portion 3 has not been successfully established by the self-restart process, it is impossible for the control portion 5 to operate the image reading portion 3 properly, in which case this flow chart does not have to be executed.

The control portion 5 instructs the image reading portion 3 to read a white reference plate 31 (see FIG. 3) provided in the image reading portion 3 (Step #31). The white reference plate 31 is a plate for obtaining a white reference (pure white) for a shading correction and is provided at a prescribed position in the image reading portion 3.

Under this instruction, the image reading portion 3 performs an operation of reading the white reference plate 31 (Step #32). To be specific, by using a moving mechanism (not shown) including a motor, a wire, and a pulley, the image reading portion 3 moves a lamp 32 to a position at which the white reference plate 31 is to be read and performs the reading. The lamp 32 (see FIG. 3) and an image sensor 33 (see FIG. 3) of the image reading portion 3 operate. An analog output of the image sensor 33 is converted to digital form by an A/D conversion portion 34 (see FIG. 3). A configuration also may be adopted in which reading of the white reference plate 31 is performed plural times, and an average of values of pixels is set as a pixel value of the pixels.

When, as a result of an earthquake, no malfunction has occurred in the image reading portion 3, image data of lines having a pixel value of a bright color (white) alone is obtained. On the other hand, when a malfunction has occurred in the image reading portion 3, such as that the lamp 32 does not light up, that the image sensor 33 is malfunctioning, or that a position of the lamp 32 is not appropriate, image data of lines of white (a bright color alone) cannot be obtained. Based on this, when image data obtained by reading the white reference plate 31 includes a pixel having a pixel value of a color darker (deeper) than a threshold value, it is acknowledged that, due to an earthquake, a malfunction has occurred in the image reading portion 3.

The control portion 5, therefore, checks whether or not all pixels of the image data of lines obtained by the operation of reading the white reference plate 31 have a pixel value of a color brighter than the threshold value (Step #33). When all the pixels of the image data of the white reference plate 31 have a pixel value of a color brighter than the threshold value (Yes at Step #33), the control portion 5 diagnoses that the image reading portion 3 operates properly (Step #34). On the other hand, when the image data of lines obtained by the operation of reading the white reference plate 31 includes one or more pixels of the same color as the threshold value or a color deeper than the threshold value (No at Step #33), the control portion 5 diagnoses that the image reading portion 3 does not operate properly (Step #35). Step #34 and Step #35 complete the individual diagnosis process for the image reading portion 3 (End). When, by the individual diagnosis process, it is diagnosed that the image reading portion 3 does not operate properly, the control portion 5 judges that the scan transmission job and the copy job are non-executable.

(Order of Execution of Individual Diagnosis Processes)

The foregoing description has explained the individual diagnosis processes for the printing portion 4, the communication portion 7, and the image reading portion 3. There is no particular limitation on an order in which the respective individual diagnosis processes are executed, and the order can be set as appropriate. Or alternatively, in consideration of a possibility that these portions are used in the order of priority after the occurrence of an earthquake, the individual diagnosis processes may be executed in the order of the individual diagnosis process for the printing portion 4→the individual diagnosis process for the communication portion 7→the individual diagnosis process for the image reading portion 3.

(Normal Mode)

Figure 10:
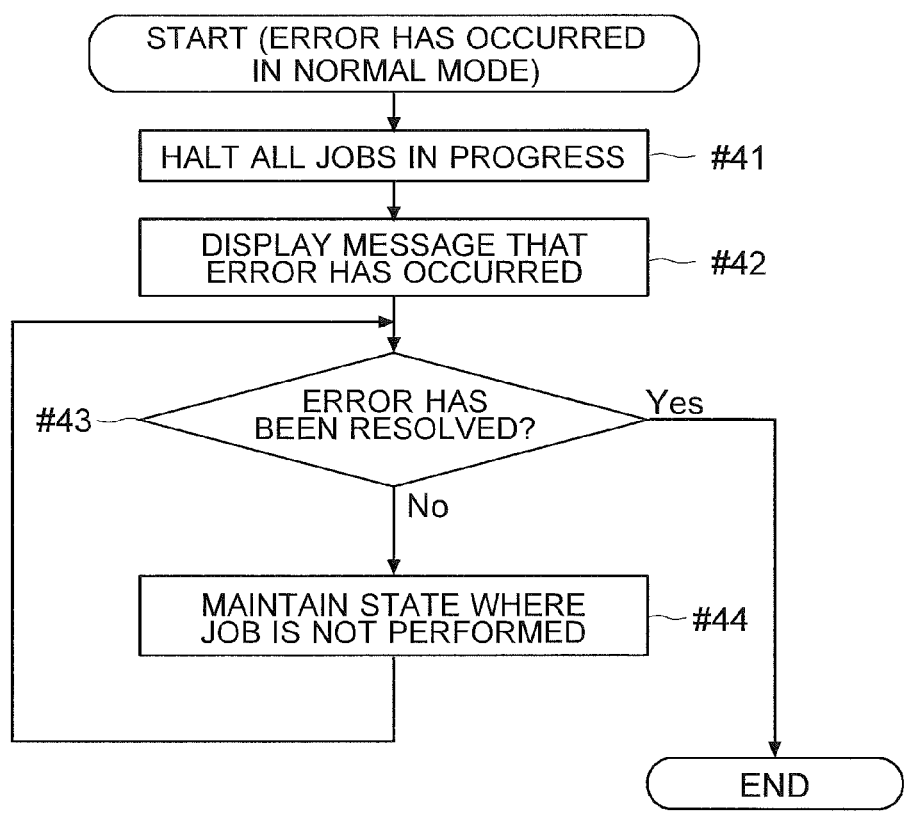
FIG. 10 is a flow chart showing a flow of a process in a normal mode.

Next, with reference to FIG. 10, an explanation is given of an operation performed at the occurrence of an error in the normal mode. A timing of "Start" in FIG. 10 is a point in time when, in the normal mode, the control portion 5 has detected the occurrence of an error. In a similar manner to the individual diagnosis process, the control portion 5 detects the occurrence of an error. When paper sheet jamming has occurred, the control portion 5 detects the occurrence of an error in the printing portion 4. Furthermore, when the communication portion 7 is not capable of proper data communication, the control portion 5 detects the occurrence of an error in the communication portion 7. Furthermore, when data obtained by reading the white reference plate 31 includes a pixel having a pixel value of the same color as the threshold value or a color deeper than the threshold value, the control portion 5 detects the occurrence of an error in the image reading portion 3.

Furthermore, in a similar manner to the self-restart process, when, at start-up, communication between the control portion 5 and the various portions included in the multi-functional peripheral 100 such as the operation panel 1, the original document conveying portion 2, the image reading portion 3, the engine control portion 40 (printing portion 4), and the communication portion 7 cannot be established, the control portion 5 detects the occurrence of a communication error with the various portions.

Upon detecting the occurrence of an error, the control portion 5 halts all of jobs in progress, if any (Step #41). For example, at the occurrence of a paper sheet jam, continued paper sheet conveyance may end up aggravating the degree of paper jamming, making it difficult to remove a stuck paper sheet or exerting a large force on a member on a conveying path to cause damage thereto. For this reason, upon detecting the occurrence of an error in the normal mode, the control portion 5 halts all of jobs in progress.

Subsequently, the control portion 5 makes the display portion 11 of the operation panel 1 display a message that an error has occurred (Step #42, Output of message that error has occurred). At this time, the control portion 5 may make the display portion 11 display, together with the message that an error has occurred, what type of error has occurred.

The control portion 5 checks whether or not the error that has occurred has been resolved (Step #43). For example, in a case where a user, after working to resolve the error, enters on the operation panel 1 an input that the error has been resolved, the control portion 5 recognizes that the error that has occurred has been resolved.

While the error has not been resolved yet (No at Step #43→Step #44→Return to Step #43), the control portion 5 maintains a state of not performing any job (Step #44). On the other hand, when the error has been resolved, this flow is completed (End). Then, until a new error is detected, in accordance with an instruction to execute a job inputted to the multi-functional peripheral 100, the control portion 5 makes any of the various portions in the multi-functional peripheral 100 execute the job.

The image forming apparatus (multi-functional peripheral 100) according to the embodiment includes a detection portion (communication portion 7) for detecting the occurrence of an earthquake, a plurality of job execution portions (the original document conveying portion 2, the image reading portion 3, the operation panel 1, the printing portion 4, and the communication portion 7) that each execute a job, an output portion (the display portion 11, the printing portion 4, and the communication portion 7) that outputs information, and the control portion 5 that controls the job execution portions, upon the detection portion detecting the occurrence of an earthquake, switches a mode of the image forming apparatus (multi-functional peripheral 100) from a normal mode to an emergency mode, after a lapse of a predetermined wait time since the switching to the emergency mode, executes a self-diagnosis process for checking whether or not the job execution portions operate properly, based on a result of the self-diagnosis process, determines an executable job and a non-executable job, and makes the output portion output information indicating the executable job and the non-executable job.

Whether or not, due to the occurrence of an earthquake, a malfunction occurs in the image forming apparatus (multi-functional peripheral 100) and in which portion such a malfunction occurs depend on a size of the image forming apparatus and a place at which the image forming apparatus is installed. The control portion 5, therefore, performs a diagnosis on whether or not each of the job execution portions (the original document conveying portion 2, the image reading portion 3, the operation panel 1, the printing portion 4, and the communication portion 7) included in the image forming apparatus operate properly. This diagnosis identifies which function among functions of the image forming apparatus is available and which function among them is unavailable. Then, a result of the diagnosis is made known to a user. Thus, the user can recognize easily and promptly an available function among the functions of the image forming apparatus.

It is prevented to execute a job of a function that is made unavailable due to a malfunction caused by an earthquake. Furthermore, it is made possible to execute, even after the occurrence of an earthquake, a function that is still alive (a properly executable job) as circumstances demand. Furthermore, since a result of the self-diagnosis process is outputted, a person in charge of maintenance is saved the trouble of locating a malfunctioning area. That is, the result of the self-diagnosis process can be utilized for repair and maintenance of the image forming apparatus. As a result, repair and maintenance can be completed promptly.

Furthermore, in the normal mode, upon determining a portion that does not operate properly among the plurality of job execution portions (the original document conveying portion 2, the image reading portion 3, the operation panel 1, the printing portion 4, and the communication portion 7), the control portion 5 makes the output portion (operation panel 1) output a message that an error has occurred and halts execution of all jobs. Furthermore, upon determining, as a result of performing the self-diagnosis process in the emergency mode, that any of the job execution portions does not operate properly, the control portion 5 prevents a job using the portion that does not operate properly from being executed and has an executable job executed by using any other of the job execution portions that operates properly.

By this configuration, in the emergency mode, a function (job) using a portion in which a malfunction has occurred due to an earthquake is isolated, and tentatively, the malfunction is left unattended ("isolation of a malfunction"). Then, in an emergency of the occurrence of an earthquake, it is made possible to use, among the functions of the image forming apparatus (multi-functional peripheral 100), at least a function available under present circumstances. Thus, in the emergency mode, even when an error has occurred in part of the functions, without requesting a user to resolve the error, the image forming apparatus is kept in a state of being able to perform an executable job. On the other hand, in a situation that is not acknowledged as an emergency, when a portion that does not operate properly is determined, the image forming apparatus can be kept in an unavailable state so as not to aggravate the degree of a malfunction.

Furthermore, one of the job execution portions is the printing portion 4 that performs printing. The printing portion 4 includes at least the conveying sensors S1 to S5 for checking whether or not paper sheet conveyance is performed appropriately. After switching to the emergency mode, the control portion 5 has printing performed based on predetermined image data, and upon recognizing, based on an output of each of the conveying sensors S1 to S5, that a paper sheet on which the image data has been printed has been conveyed without an error and then ejected to the outside of the apparatus, diagnoses that the printing portion 4 operates properly. Further, upon detecting, based on the output of each of the conveying sensors S1 to S5, an error of paper jamming with the paper sheet on which the image data has been printed, and when being unable to control the printing portion 4, the control portion 5 diagnoses that the printing portion 4 does not operate properly.

Immediately after the occurrence of a massive earthquake, some users may want to print, without any delay, documents such as a payroll, materials for confirming safe conditions, or the like. Immediately after the occurrence of a massive earthquake, there is a high possibility of using a printing function of the image forming apparatus (multi-functional peripheral 100). For this reason, upon the occurrence of an earthquake being detected, the control portion 5 diagnoses whether or not printing is properly executable. By this configuration, immediately after the occurrence of an earthquake, a user can be notified promptly of whether or not a job related to printing is executable.

Furthermore, as the predetermined image data, image data (shift checking image data 67) of the chart 8 for checking a color shift and a positional shift of an image to be printed on a paper sheet is used. After switching to the emergency mode, the printing portion 4 performs printing of the chart 8. After switching to the emergency mode, the printing portion 4 performs printing of the chart 8. By this configuration, a user can visually check a printed document to determine whether or not, as a result of an earthquake, an image has been printed at an appropriate position (whether or not a large shift has occurred). It is also possible to check whether or not image quality of the image forming apparatus (multi-functional peripheral 100) has been deteriorated.

Furthermore, the job execution portions includes the communication portion 7. After switching to the emergency mode, the control portion 5 makes the communication portion 7 perform data transmission/reception to/from a predetermined communication partner, and when communication with the communication partner has been successfully achieved without an error, diagnoses that the communication portion 7 operates properly. Further, when an error has occurred in communication between the communication portion 7 and the communication partner, and when being unable to control the communication portion 7, the control portion 5 diagnoses that the communication portion 7 does not operate properly. Immediately after the occurrence of a massive earthquake, some users may want to transmit, from the image forming apparatus (multi-functional peripheral 100), data for safety confirmation or data to make a current situation known to other places. Immediately after the occurrence of an earthquake, there is a high possibility of using a transmission (communication) function of the image forming apparatus. For this reason, upon the occurrence of an earthquake being detected, the control portion 5 diagnoses whether or not proper communication can be achieved. By this configuration, a user can be notified promptly of whether or not a job related to communication is executable.

Furthermore, after a lapse of the wait time since the detection portion (communication portion 7) has detected the occurrence of an earthquake, before executing the self-diagnosis process, the control portion 5 performs the self-restart process of restarting software related to control. By this configuration, it is possible to make the control portion 5 diagnose whether or not the software starts up perfectly without any problem, whether or not communication with the portions controlled by the control portion 5 is achieved properly, whether or not a malfunction has occurred in the control portion 5, and which of the portions to be controlled is controllable/uncontrollable.

Furthermore, the image forming apparatus (multi-functional peripheral 100) includes the display portion 11 that displays information. The output portion is composed of the printing portion 4, the communication portion 7, and the display portion 11. With the plurality of portions (the display portion 11, the printing portion 4, and the communication portion 7) included in the output portion, even when an earthquake has occurred, based on information outputted from any of the portions in the output portion, a user can recognize a status of the image forming apparatus after the occurrence of the earthquake.

What is claimed is:
1. An image forming apparatus, comprising:
  a detection portion for detecting occurrence of an earthquake;
  a plurality of types of job execution portions that each execute a job;
  an output portion that outputs information; and
  a control portion that controls the job execution portions, upon the detection portion detecting the occurrence of an earthquake, switches a mode of the image forming apparatus from a normal mode to an emergency mode, after a lapse of a predetermined wait time since the switching to the emergency mode, executes a self-diagnosis process for checking whether or not the job execution portions operate properly, based on a result of the self-diagnosis process, determines an executable job and a non-executable job, and makes the output portion output information indicating the executable job and the non-executable job.
2. The image forming apparatus according to claim 1, wherein in the normal mode, upon determining a portion that does not operate properly among the plurality of job execution portions, the control portion makes the output portion output a message that an error has occurred and halts execution of all jobs, and upon determining, as a result of performing the self-diagnosis process in the emergency mode, a portion that does not operate properly among the plurality of job execution portions, the control portion prevents a job using the portion that does not operate properly from being executed and has the executable job executed by using any other of the job execution portions that operates properly.

3. The image forming apparatus according to claim 1, wherein the job execution portions include a printing portion that performs printing, the printing portion includes at least a conveying sensor for checking whether or not paper sheet conveyance is performed appropriately, and after the switching to the emergency mode, the control portion has printing performed based on predetermined image data, upon recognizing, based on an output of the conveying sensor, that a paper sheet on which the image data has been printed has been conveyed without an error and then ejected to an outside of the apparatus, diagnoses that the printing portion operates properly, and upon detecting, based on the output of the conveying sensor, an error of paper jamming with the paper sheet on which the image data has been printed, or when being unable to control the printing portion, diagnoses that the printing portion does not operate properly.

4. The image forming apparatus according to claim 3, wherein as the image data, image data of a chart for checking a color shift and a positional shift of an image to be printed on a paper sheet is used, and after the switching to the emergency mode, the printing portion performs printing of the chart.

5. The image forming apparatus according to claim 1, wherein the job execution portions include a communication portion that performs communication via a network or a cable, and after the switching to the emergency mode, the control portion makes the communication portion perform data transmission/reception to/from a predetermined communication partner, when communication with the communication partner has been successfully achieved without an error, diagnoses that the communication portion operates properly, and when an error has occurred in communication between the communication portion and the communication partner, or when being unable to control the communication portion, diagnoses that the communication portion does not operate properly.

6. The image forming apparatus according to claim 1, wherein after a lapse of the wait time since the detection portion has detected the occurrence of an earthquake, before executing the self-diagnosis process, the control portion performs a self-restart process of restarting software related to control.

7. The image forming apparatus according to claim 1, wherein the job execution portions include an image reading portion that reads an original document to generate image data, the image reading portion includes a white reference plate used for a shading correction, a lamp, an image sensor, and an A/D conversion portion that performs conversion of an analog output of the image sensor, and when all pixels of image data of lines obtained by an operation of reading the white reference plate are brighter than a threshold value, the control portion diagnoses that the image reading portion operates properly, and when the image data of the white reference plate includes one or more pixels of a same color as the threshold value or a color deeper than the threshold value, the control portion diagnoses that the image reading portion does not operate properly.

8. The image forming apparatus according to claim 1, wherein the job execution portions include a printing portion that performs printing, a communication portion that performs communication via a network or a cable, and an image reading portion that reads an original document to generate image data, when it is successfully diagnosed that the printing portion and the communication portion operate properly, the control portion judges that a print job is executable, and when it is diagnosed that either the printing portion or the communication portion does not operate properly, the control portion judges that the printing job is non-executable, when it is successfully diagnosed that the printing portion and the image reading portion operate properly, the control portion judges that a copy job is executable, and when it is diagnosed that either the printing portion or the image reading portion does not operate properly, the control portion judges that the copy job is non-executable, and when it is successfully diagnosed that the image reading portion and the communication portion operate properly, the control portion judges that a scan transmission job is executable, and when it is diagnosed that either the image reading portion or the communication portion does not operate properly, the control portion judges that the scan transmission job is non-executable.

9. The image forming apparatus according to claim 1, wherein the output portion is composed of a printing portion that performs printing, a communication portion that performs communication via a network or a cable, and a display portion that displays information, and at least one of the printing portion, the communication portion, and the display portion outputs the information indicating the executable job and the non-executable job.

10. A method for controlling an image forming apparatus, comprising steps of:

detecting occurrence of an earthquake;

upon detecting the occurrence of an earthquake, switching a mode of the image forming apparatus from a normal mode to an emergency mode;

after a lapse of a predetermined wait time since the switching to the emergency mode, executing a self-diagnosis process for checking whether or not each of a plurality of types of job execution portions that each execute a job operates properly;

based on a result of the self-diagnoses process, determining an executable job and a non-executable job, and outputting information indicating the executable job and
the non-executable job.

\* \* \* \* \*